US011370346B2

(12) United States Patent
Castillo et al.

(10) Patent No.: US 11,370,346 B2
(45) Date of Patent: Jun. 28, 2022

(54) APPARATUSES, METHODS AND SYSTEMS WITH A VEHICLE ARCHITECTURE FOR UNMANNED AUTONOMOUS VEHICLES

(71) Applicant: GM GLOBAL TECHNOLOGY OPERATIONS LLC, Detroit, MI (US)

(72) Inventors: Brian V. Castillo, Birmingham, MI (US); Wade W. Bryant, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 546 days.

(21) Appl. No.: 16/550,741

(22) Filed: Aug. 26, 2019

(65) Prior Publication Data

US 2021/0061157 A1 Mar. 4, 2021

(51) Int. Cl.
| | |
|---|---|
| *B60P 3/40* | (2006.01) |
| *G05D 1/00* | (2006.01) |
| *B60P 1/64* | (2006.01) |
| *B62D 63/02* | (2006.01) |
| *B62D 65/02* | (2006.01) |
| *G05D 1/02* | (2020.01) |

(52) U.S. Cl.
CPC ............... *B60P 3/40* (2013.01); *B60P 1/6409* (2013.01); *B62D 63/025* (2013.01); *B62D 65/02* (2013.01); *G05D 1/0027* (2013.01); *G05D 1/021* (2013.01)

(58) Field of Classification Search
CPC ........ B60P 3/40; B60P 1/6409; B62D 63/025; B62D 65/02; B62D 7/1509; B62D 21/02; B62D 24/00; G05D 1/0027; G05D 1/021
See application file for complete search history.

(56) References Cited

U.S. PATENT DOCUMENTS

2020/0262263 A1* 8/2020 Doerksen ................ B60P 3/007

FOREIGN PATENT DOCUMENTS

| CN | 111780990 A | * | 10/2020 | |
| CN | 113465894 A | * | 10/2021 | |
| EP | 2673218 B1 | * | 12/2016 | ............... B65G 1/02 |

* cited by examiner

*Primary Examiner* — Mary Cheung
(74) *Attorney, Agent, or Firm* — Lorenz & Kopf LLP

(57) ABSTRACT

Apparatuses, methods and systems are provided for forming an autonomous vehicle of an upper body unit configured to consume space in an upward direction to minimize a horizontal footprint and enable a stacking of vehicle components on top of each other in the upward direction; a lower chassis unit configured to oppose the upper body unit and include a structure for supporting the modular unit with prismatic cross members to configure to a range of module unit widths, the lower chassis unit including: a set of structural rails on either side of the lower chassis unit configured in a rigid frame unit with longitudinal members wherein the structural rails can be attached to another corresponding set of structural rails; a plurality of compartment units including: front-compartment, rear-compartment, and mid-compartment units configured to be attached on either side of the lower chassis unit for the forming of the autonomous vehicle.

20 Claims, 7 Drawing Sheets

APPARATUSES, METHODS AND SYSTEMS WITH A VEHICLE ARCHITECTURE FOR UNMANNED AUTONOMOUS VEHICLES

TECHNICAL FIELD

The technical field generally relates to an unmanned and/or self-propelled vehicle that is used to transport a payload, and more particularly relates to an architecture of a configuration of elements including energy storage batteries, power electronics, electric drive unit, and ancillary systems to enable the construction and operation of an array of non-passenger-bearing autonomous vehicles.

An unmanned autonomous vehicle is a self-propelled vehicle that can be used to transport a payload along a route or from place to another without real-time human assistance. Because an autonomous vehicle operates via computer-controlled navigation, it eliminates the need for a human operator. However, vehicle architectures designed for passenger vehicles, when used for unmanned autonomous vehicles, tend to incur mass, and cost penalties and limit configuration flexibility.

It is desirable to provide a cost-effective modular architecture useful for constructing an array of different unmanned autonomous vehicles by segregating, and packaging the various components that make up the autonomous vehicle into discrete modules. It is desirable for such an architecture to include a sufficiently diverse selection modules as to enable the construction of a wide array of different autonomous vehicle configurations for transporting various payloads while maximizing component re-use and minimizing complexity.

Accordingly, it may be desirable to provide improved apparatuses, methods, and systems using a modular vehicle architecture around autonomous vehicles designed for transporting payloads rather that adopting the conventional passenger vehicle architecture for performing the transport functions.

Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, apparatuses, methods, and systems are provided for forming an autonomous vehicle using an architecture which includes one or more autonomous drive modules.

In an exemplary embodiment an apparatus configured with an architecture of an autonomous modular drive unit for forming an autonomous vehicle is provided. The apparatus includes: the autonomous modular drive unit comprising: an upper body unit configured to consume space in an upward direction to minimize a horizontal footprint of the upper body unit and enable a stacking of a set of vehicle components on top of each other in the upward direction comprising a battery pack residing at a bottom of the upper body unit, on top of which are components of a charger and high-voltage (HV) electronics, and space allotted on either side of the upper body unit for sensor packages; a lower chassis unit configured to oppose the upper body unit and comprise a structure for supporting the modular unit with prismatic cross members to configure to a range of module unit widths, the lower chassis unit comprising: a drive unit within the lower chassis unit coupled to an axle with a set of wheels on either side; and a set of structural rails on either side of the lower chassis unit configured in a rigid frame unit with longitudinal members wherein the structural rails can be attached to another corresponding set of structural rails; a plurality of compartment units comprising: front-compartment, rear-compartment, and mid-compartment units configured to be attached on either side of the lower chassis unit for the forming of the autonomous vehicle; at least one sensor placed at an upper peripheral edge of the upper body unit to enable a greater field-of-view resulting from the upward direction of the upper body unit; and a set of ducts positioned on either side of the upper body unit and ducted upward through a horizontally oriented heat exchanger at a top surface to the upper body unit un-pinged airflow in air flow-path resulting from a lower air pressure at the top surface of the heat exchange while the autonomous vehicle is in motion.

In various exemplary embodiments, the apparatus further includes: a control system located in the upper body unit which is designed in a parametric configuration of geometric values including items of a wheelbase, overhangs, vehicle width, and control parameters that enable a tailored configuration to a specific application for the autonomous modular drive unit without need for a gross revision of the control system. The autonomous modular drive unit is configured to the specific application using a generic control system, or re-configured if the configuration is changed during a life of the drive unit. The apparatus, further includes: one or more control parameters selected by an user to configure an autonomous system of the autonomous modular drive unit for processing one or more inputs to generate one or more outputs taking into account attributes of a vehicle operating surface, guidance mapping and vehicle variations in configurations. The apparatus includes the prismatic cross members are arranged in parallel to each other and symmetric about a centerline of the autonomous modular drive unit such that a cutting of an extrusion or a prismatic shape to a different length of each prismatic cross member enables a change of width of the autonomous modular drive unit.

The apparatus further includes: a set of autonomous modular drive units configured with a data link between control units of each autonomous modular drive unit to communicate information between each autonomous modular drive unit at least comprising sensor data, wheel speeds, torques and steering angles to enable coordination between each module unit of torque, braking and steering functions. The communications between control units provide redundancy to enhance safety as a failure of a particular control unit of an autonomous modular drive unit can be detected by another autonomous modular drive control unit. The data link configured between each set of autonomous modular drive units enables combinations of steering and torque application outputs that result in producing motions such as counter-steering, parallel steering, and skid steering of sets of autonomous modular drive units. The apparatus further includes: a non-driven wheel module integrated with the upper body unit and is configured with a similar chassis unit of the autonomous modular drive unit without the inclusion of the drive unit. The non-driven wheel module is a stand-alone modular component detachable from the upper body unit. The apparatus further includes: an open bed-style mid-compartment affixed to the non-driven wheel module coupled to an autonomous modular drive unit. The apparatus further includes: a set of multiple non-driven wheel modules or a set of multiple autonomous connected in series and affixed to one or more rear compartment modules.

In another exemplary embodiment a method using an architecture of modular units of an autonomous modular drive unit for forming an autonomous vehicle is provided. The method includes: configuring an upper body unit to consume space in an upward direction to thereby minimizing a horizontal footprint of the upper body unit by enabling a stacking of a set of vehicle components on top of each other in the upward direction comprising: a battery pack residing at a bottom of the upper body unit, on top of which are components of a charger and high-voltage (HV) electronics, and allotting space on either side of the upper body unit for sensor packages; configuring a lower chassis unit for opposing the upper body unit and comprising a structure for supporting the modular unit with prismatic cross members for configuring a range of module unit widths by: coupling a drive unit within the lower chassis unit to an axle with a set of wheels on either side; and configuring a set of structural rails on either side of the lower chassis unit in a rigid frame unit with longitudinal members wherein the structural rails can be attached to another corresponding set of structural rails; attaching a plurality of compartment units comprising: front-compartment, rear-compartment, and mid-compartment units configured on either side of the lower chassis unit for the forming of the autonomous vehicle; placing at least one sensor placed at an upper peripheral edge of the upper body unit to enable a greater field-of-view resulting from the upward direction of the upper body unit; and positioning a set of ducts on either side of the upper body unit and ducted upward through a horizontally oriented heat exchanger at a top surface to the upper body unit thereby un-pinging airflow in air flow-path resulting from a lower air pressure at the top surface of the heat exchange while the autonomous vehicle is in motion.

In various exemplary embodiments, the method further includes: configuring a control system located in the upper body unit with a parametric design of geometric values including items of a wheelbase, overhangs, vehicle width, and control parameters that enable a tailoring to a specific application for the autonomous modular drive unit without needing a gross revision of the control system; configuring the autonomous modular drive unit to the specific application using a generic control system, or re-configuring if the configuration is changed during a life of the drive unit; and selecting, by a user, one or more control parameters to configure an autonomous system of the autonomous modular drive unit for processing one or more inputs to generate one or more outputs taking into account attributes of a vehicle operating surface, guidance mapping and vehicle variations in configurations.

Additionally, the method further includes: arranging each of the prismatic cross-members in parallel to each other and symmetric about a centerline of the autonomous vehicle thereby enabling only a step of a cutting of an extrusion or a prismatic shape to change to a different length of each prismatic cross member resulting in a change of width of the autonomous modular drive unit. The method also includes: configuring a set of autonomous modular drive units with a data link between control units of each autonomous modular drive unit for communicating information between each autonomous modular drive unit at least comprising sensor data, wheel speeds, torques and steering angles to enable coordination between each module unit of torque, braking and steering functions; providing redundancy in communications between control units to enhance safety as a failure of a particular control unit of an autonomous modular drive unit can be detected by another autonomous modular drive control unit; and configuring the data link between each set of autonomous modular drive units thereby enabling combinations of steering and torque application outputs that result in producing motions such as counter-steering, parallel steering, and skid steering of sets of autonomous modular drive units.

Also, the method includes: integrating a non-driven wheel module with the upper body unit or as a standalone modular component detachable from the upper body unit which is configured with a similar chassis unit of the autonomous modular drive unit without the including the drive unit; and affixing an open bed-style mid-compartment to the non-driven wheel module coupled to the autonomous modular drive unit.

In yet another exemplary embodiment, a system configured with an architecture of an autonomous modular drive unit for forming an autonomous vehicle is provided. The system includes: the autonomous modular drive unit comprising: an upper body unit configured to consume space in an upward direction to minimize a horizontal footprint of the upper body unit and enable a stacking of a set of vehicle components on top of each other in the upward direction comprising a battery pack residing at a bottom of the upper body unit, on top of which are components of a charger and high-voltage (HV) electronics, and space allotted on either side of the upper body unit for sensor packages; a lower chassis unit configured to oppose the upper body unit and comprise a structure for supporting the modular unit with prismatic cross members to configure to a range of module unit widths, the lower chassis unit comprising: a drive unit within the lower chassis unit coupled to an axle with a set of wheels on either side; and a set of structural rails on either side of the lower chassis unit configured in a rigid frame unit with longitudinal members wherein the structural rails can be attached to another corresponding set of structural rails; a plurality of compartment units comprising: front-compartment, rear-compartment, and mid-compartment units configured to be attached on either side of the lower chassis unit for the forming of the autonomous vehicle; at least one sensor placed at an upper peripheral edge of the upper body unit to enable a greater field-of-view resulting from the upward direction of the upper body unit; a set of ducts positioned on either side of the upper body unit and ducted upward through a horizontally oriented heat exchanger at a top surface to the upper body unit un-pinged airflow in air flow-path resulting from a lower air pressure at the top surface of the heat exchange while the autonomous vehicle is in motion; a control system located in the upper body unit which is designed in a parametric configuration of geometric values comprising items of a wheelbase, overhangs, vehicle width, and control parameters that enable a tailored configuration to a specific application for the autonomous modular drive unit without need for a gross revision of the control system wherein the autonomous modular drive unit is configured to the specific application using a generic control system, or re-configured if the configuration is changed during a life of the drive unit; and a data link between control units of sets of autonomous modular drive units to communicate information between each autonomous modular drive unit at least comprising sensor data, wheel speeds, torques and steering angles to enable coordination between each module unit of torque, braking and steering functions wherein communications between control units provide redundancy to enhance safety as a failure of a particular control unit of an autonomous modular drive unit can be detected by another autonomous modular drive control unit wherein the data link configured between each set of autonomous modular drive units enables combinations of steering and torque application outputs that result in producing motions such as counter-steering, parallel steering, and skid steering of sets of autonomous modular drive units.

In an exemplary embodiment, the system includes each of the prismatic cross members are arranged in parallel to each other and symmetric about a centerline of the autonomous modular drive unit such that a cutting of an extrusion or a prismatic shape to a different length of each prismatic cross member results in a change of width of the modular drive unit.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
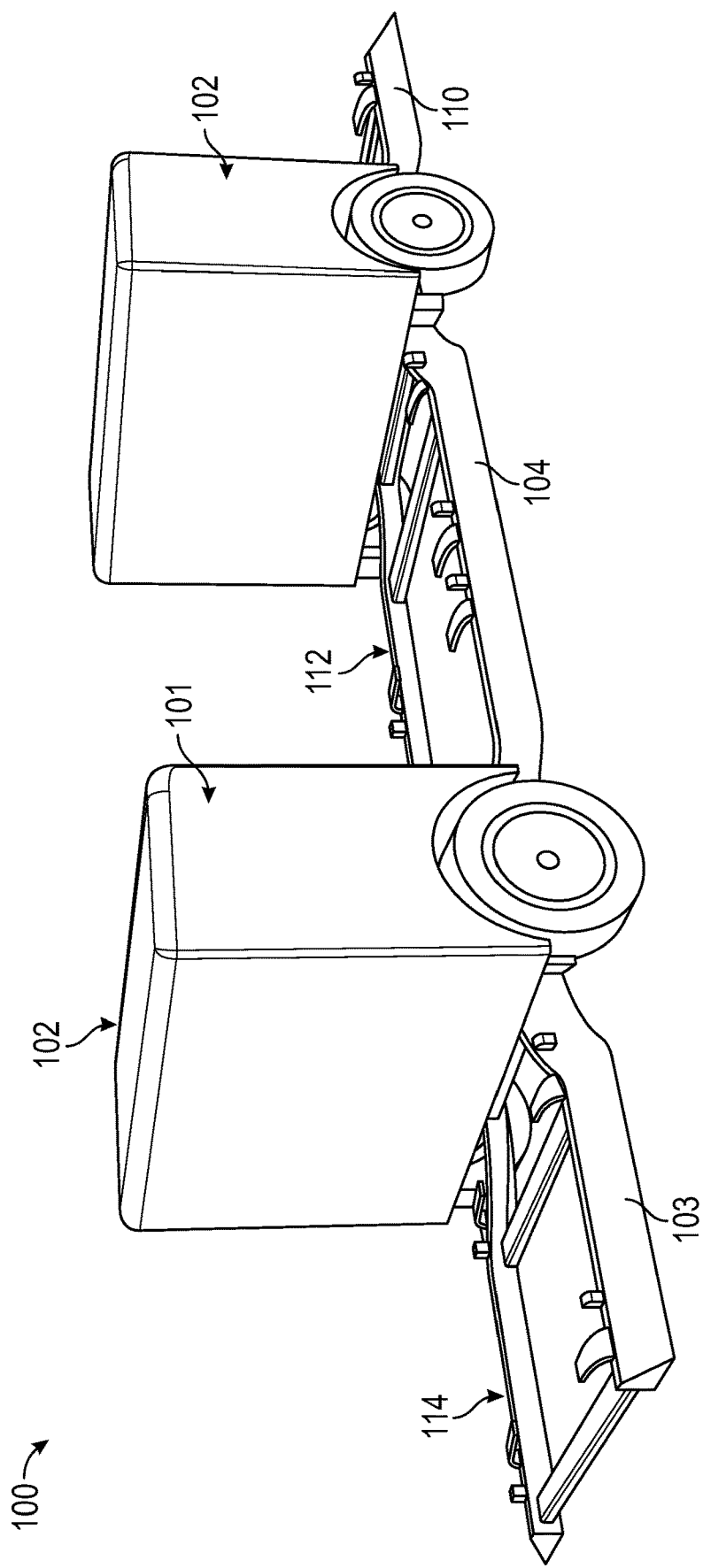
FIG. 1 illustrates a vehicle composed of the autonomous drive modules, in accordance with an embodiment.

The following detailed description is merely exemplary in nature and is not intended to limit the disclosure or the application and uses thereof. Furthermore, there is no intention to be bound by any theory presented in the preceding background or the following detailed description.

In some examples, an autonomous vehicle is an unmanned and self-propelled robotic vehicle that is used to transport a payload along a route which can be pre-defined or determined in real-time by the autonomous vehicle itself. The autonomous vehicle may utilize in its modular architecture various components of a controller, optical sensors, distance sensors, a global positioning system (GPS), and/or laser guidance for navigation, merely as examples. For purposes of this disclosure, a limited number of components are described in the modular architecture presented. However, it is contemplated that the disclosure is not limited in the number and type of components that can be used in the modular architecture described; and the modular architecture is flexible to be configured with more, less or other components that are used in the operation of an autonomous vehicle.

For purposes of this disclosure the following definitions are put-forth to assist in understanding the disclosure; however it is contemplated that the definitions proffered are not to limit the present invention and ordinary meanings as well common technical usages may also be used to interpret the terms. The term "vehicle" connotes the implementation of "top level" products that are derived via applications of an architecture, with architecture being defined as a system of mutually compatible dimensions, interfaces, systems, and components. The term "chassis" connotes components with load-bearing, propulsive, steering, and braking functions, including wheels, suspension, axles, and structure put together. The term "modular" connotes using discrete and interchangeable modules as the basis for construction of a vehicle. The terms "front", "rear" and "mid"; each connotes the front section on the leading edge during normal motion; the rear section on the trailing edge during normal motion; and the mid-section between the axles. The term "upper body" connotes a body unit and references portions of the modules that are above the chassis and supported by the chassis. The term "architecture" herein is defined as a system of mutually compatible dimensions, interfaces, systems, and components. The autonomous drive module is an integrated module that encompasses the batteries, drive motor, wheels, axles, sensors, etc. and is enabled to provide motive power, sensing, and control functions to the autonomous vehicle. That is, the autonomous vehicle is composed of various modules, including at least one autonomous drive module. The structural rails installed in all the modules (whether being the front-, rear- or mid-modules) interface with the autonomous vehicle drive module and provide connectability between the modules via interfaces of the respective rails.

It should be appreciated that the overall architecture, setup, and operation, as well as the individual components of the illustrated system are merely exemplary and that differently configured communications systems, compartment sections, chassis cradles, and connectors may also be utilized to implement the examples of the method disclosed herein. Thus, the following paragraphs, which provide a brief overview of the illustrated modular architecture of the autonomous vehicle, are not intended to be limiting.

As opposed to a conventional passenger vehicle design, the function of which is to contain and protect passengers and therefore requires the body of the vehicle to have many mechanical, electrical, and structural components couplings in combination with a body for operation, this is not the case with a vehicle based on the modular architecture described herein, because such a vehicle is not required to carry passengers. Referencing FIG. 1, the autonomous vehicle 100 therefore can forgo certain requirements for an operation that are suited for a passenger vehicle.

For example, in the autonomous vehicle 100, the battery modules contained in the upper body sections 101 are packaged over the axles of each autonomous drive module 102. Such a design is not feasible for a conventional passenger vehicle, as it would block the forward vision of the occupants. Similarly, the structural rails of the front compartment 103 would, in a passenger vehicle, be optimized to provide energy absorption during a frontal crash, whereas in this vehicle they can be optimized in the absence of such a requirement, as there are no occupants to protect during a crash. Hence, a vehicle constructed from the modular architecture described herein can be optimized to the task of transporting cargo rather than occupants, and thereby realize additional efficiencies in cost, mass, and performance. The autonomous vehicle 100 is contemplated to be composed of a variety of autonomous drive modules 102 with front compartment structural rails 103 and mid-compartment structural rails 104 as desired.

Referring again to FIG. 1, which illustrates an exemplary diagram of the structural portions of the mid-compartment section 112, front-compartment section 114, and rear-compartment section 110 of the autonomous vehicle 100 in accordance with an embodiment; the autonomous vehicle 100 is configured with a pair of autonomous drive modules 102, with a mid-compartment structural rails 104 connected between them. The mid-compartment structural rails 104 that interconnect to the structural rails of the autonomous drive modules 102 are configured with a geometry that facilitates this connection, via weldment, fasteners, adhesive or similar methods.

The autonomous drive modules 102 include batteries, battery charger, power electronics, electric drive motor, autonomous vehicle sensors, and computer(s) needed to facilitate autonomous operation. The connection between the autonomous drive module and the adjacent modules is configured such that top surfaces of the front-, rear-, and mid-compartment rails is as low to the ground as possible, limited only by requisite ground clearance and the height dimension of the rails. In this fashion, the need to lift cargo when loading onto to such a vehicle is minimized, and the center-of-gravity of heavy cargo is kept as low as possible. This configuration is enabled by the placement of the batteries in the autonomous drive modules, rather than in the mid-compartment area as would be typical in a vehicle architecture configured for passenger vehicles.

Figure 2:
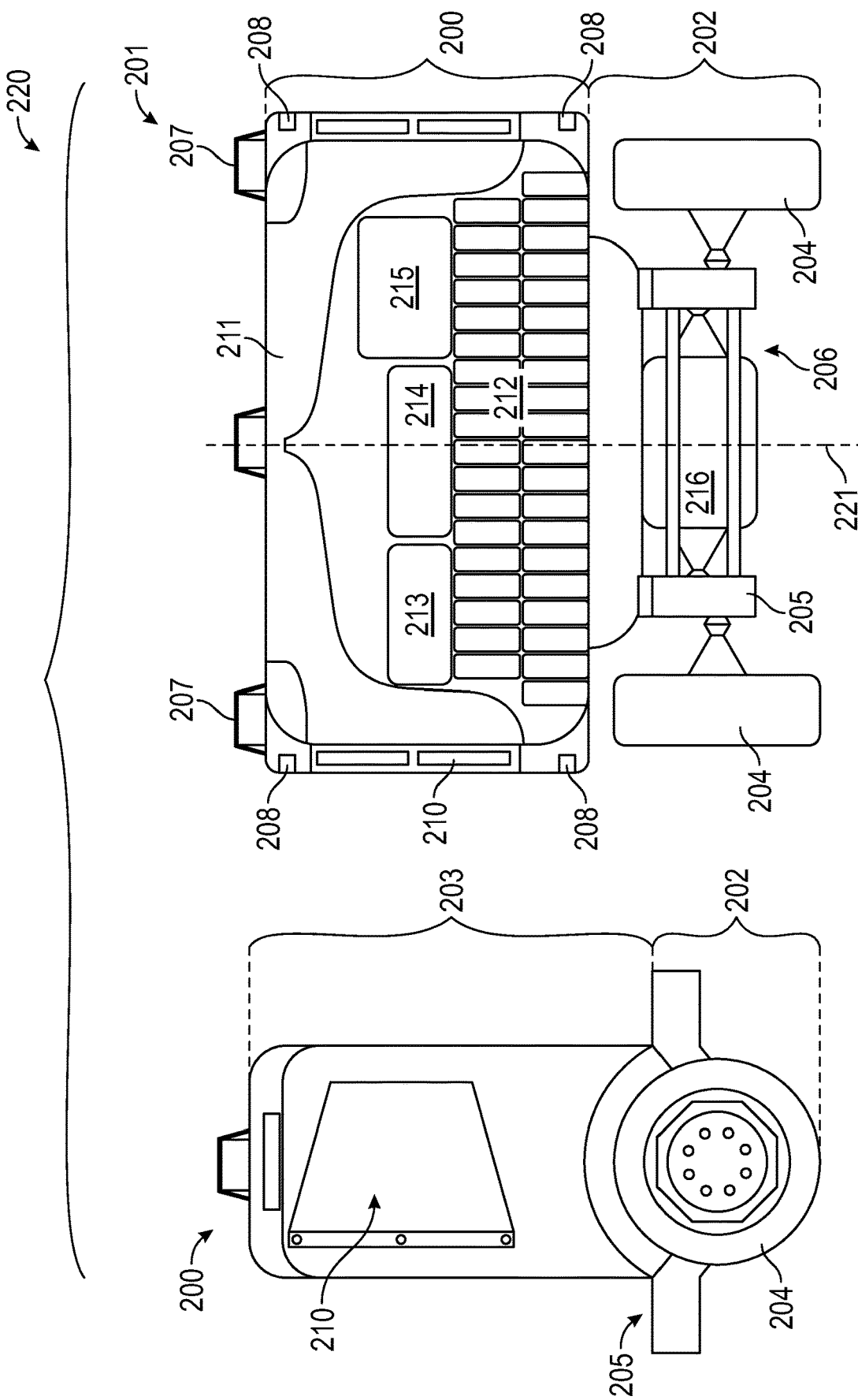
FIG. 2 is a side view and an end view respectively of the autonomous drive module, in accordance with an embodiment.

Referring now to autonomous drive module included in FIG. 2 a side view 200 having a lower chassis portion 202 and an opposing portion of an upper body portion 203. The lower chassis portion 202 of the autonomous drive module includes two wheels 204 extending therefrom for engaging the ground surface. The lower chassis portion 202 provides a protective gap between the ground surface and the upper body portion 203 that can serve to protect batteries located at the base of the upper body portion 203 minimizing then need for a protective sheath or boundary customarily employed by passenger EV vehicles. As illustrated in the end view of FIG. 2, the components within the upper body portion 203 are configured to minimize their horizontal (i.e. plan-view) footprint. That is, the upper body portion 203 is configured to consume space primarily in an upward direction. The wheels 204 may be any size or configuration that is convenient, and may be both steered and driven in order to provide forward and reverse motion, crabbing, and rotational movement capabilities with respect to a ground surface in order to maneuver an autonomous vehicle constructed from the autonomous modules as shown in the side view 200.

The autonomous drive module includes longitudinal structural rails 205 as part of the lower chassis portion 202 that enable connectivity to an adjacent module. The cross-members (i.e. lateral elements) 206 connect the longitudinal structural rails 205 so as to form a load-bearing structure to support the weight of the vehicle and its payload. In FIG. 2 in both the side view 200 and the end view 201 the geometry and the form of the autonomous drive module with the lower chassis portion 202 and the upper body portion 203 is illustrated that allows for the placement of the sensors 207 and 208 as needed for autonomous vehicle operation with placement at high peripheral edges and on the outboard periphery of the autonomous drive modules that compose the autonomous vehicle. With placement of the sensors 207 and 208, a greater field-of-view for the sensors is enabled that would be difficult to reproduce in a conventional vehicle architecture because of the presence of side-widows that present obstacles for sensor placement and usually cover much of exterior upper body portion of passenger vehicles.

The autonomous drive module utilizes a unique airflow path for the cooling system, in which air is gathered from ducts or scoops 210 placed on the either sides of the vehicle, and then ducted upward through a horizontally oriented heat exchanger(s) 211, exiting along the top surface of the module. This allows other modules to be places in front and behind the Autonomous Drive Module without impinging upon the air flow, and also takes advantage of the relatively low air pressure found along the top surface of the vehicle while in motion to help promote flow across the heat exchanger(s).

FIG. 2 illustrates an end view 201 of the autonomous drive module 220 with components, in accordance with an embodiment. In FIG. 2, there is shown a battery pack 212 of cells that are placed at the bottom of the upper body portion 203 to keep the center of gravity as low as possible, as the battery pack 212 typically has the greatest weight of the components in the upper body portion 203. On top of the battery pack 212 is the charger 213, the high-voltage (HV) electronics/inverter 214 that may also include other electronic devices such as transformers, regulators, protection elements, etc., and the computer system required for autonomous operation 215. Further, up higher (i.e., at a more elevated location of the autonomous drive module 220) in the upper body portion 203 of the autonomous drive module 220, the sensor package spaces for top-mounted sensors 207 are positioned on either side of the autonomous drive module 220. The longitudinal structural rails 205 of the lower chassis portion 202 support the weight of the upper body portion 203.

In FIG. 2, in the lower chassis portion 202, the chassis portion is configured to hold an EV drive unit 216 and to support the load of the upper body portion 203 and its associated components 212, 213, 214, 215 via a pair of longitudinal structural rails 205 on either side connected in a rigid frame by cross-members 206. The longitudinal structural rails 205 are configured to enable attachment to the corresponding rails on an array of adjacent front-, rear, and/or mid-compartment modules. This will allow for the construction of vehicle with various wheelbases, overhangs, and configurations. The lower chassis portion 202 has prismatic cross members of cross-members 206 to enable construction of autonomous drive modules of various widths without needing to perform substantial changes to the design or tooling used in manufacture of the lower chassis portion 202. The prismatic cross members 206 enable a range of module widths, such that the module width can to be tailored to a specific application. That is each of the prismatic cross members 206 are arranged in parallel to each other and symmetric about a centerline 221 of the autonomous modular drive unit such that a cutting of an extrusion or a prismatic shape to a different length of each prismatic cross member 206 enables a change of width of the autonomous modular drive module.

Figure 3A:
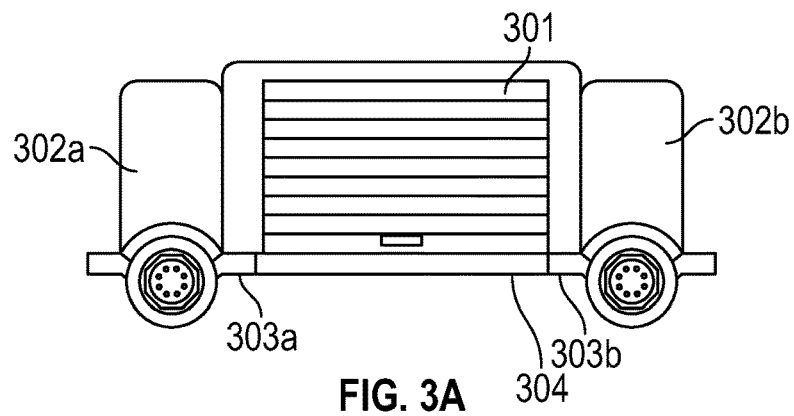
FIGS. 3A-3D illustrate exemplary diagrams of autonomous vehicles constructed using the modular architecture, and demonstrating exemplary configurations with varied front-, rear-, and mid-compartment modules, in accordance with an embodiment.
Figure 3B:
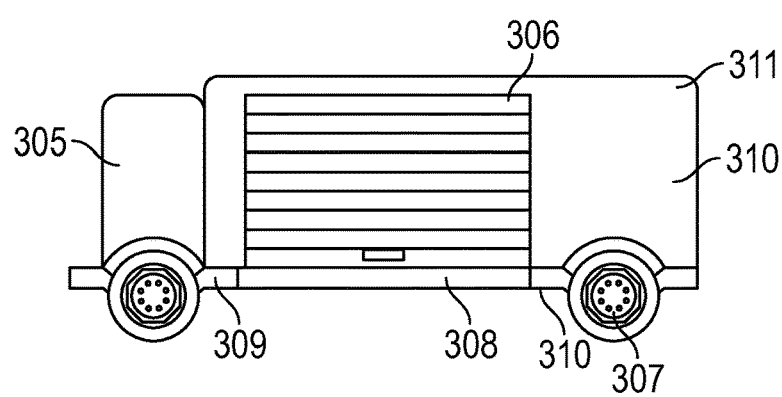

Turning now to FIGS. 3A-3D, in which examples of various mid-, front-, and rear-compartment configurations as well as various payloads that may be transported using system 300 are illustrated. In FIG. 3A an all-wheel drive (AWD) box van configuration is illustrated. Here, an enclosed mid-compartment module 301 is configured between two autonomous drive modules 302a and 302b. In this case, the rails of mid-compartment module 304 connect to rails of the autonomous drive modules 303a and 303b, forming a continuous structure to accommodate the mass of the vehicle and its payload. In FIG. 3B, another embodiment of the box van configuration is illustrated, in which a single autonomous drive module 305 is affixed to an enclosed mid-module 306, which is in turn affixed to a non-driven wheel module 307, resulting in a front-wheel-drive configuration. In this case, the structural rails of the mid-compartment rail 308 are attached to the corresponding rails 309 of the autonomous drive module 305 and the rails 309 of the non-driven wheel module 310.

In various exemplary embodiments, the mid-compartment rail 308 can be configured with an engaging or latching mechanism to connect and disengage the upper body portion 311 of the mid-compartment module as needed. The non-driven wheel module 307 may be a standalone modular component that is detachable from the upper body portion 311 or may be integrated with the upper body portion 311. The non-driven wheel module 307 is configured with a similar chassis and design as the autonomous drive module wheel system, but without the inclusion of an electric drive system.

Figure 3C:
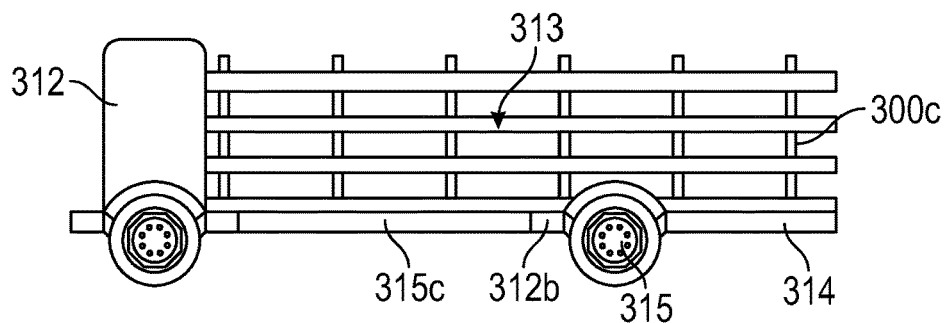

In a similar fashion, another unit body configuration is illustrated in FIG. 3C. In this embodiment, an autonomous drive module 312 is affixed to an open-bed style mid-compartment module 313, which is turn is affixed to a non-driven wheel module 315. In addition, a rear-compartment module, including a structural rail 314 is connected to the non-driven wheel module 315 to extend the vehicles rear overhang and provide additional length for cargo. The rear non-driven wheel module is configured in a similar manner to the non-driven wheel module 307. In various exemplary embodiments, multiple non-driven wheel modules 315 or autonomous drive modules 312 can be connected in series and then affixed to the rear-compartment module and/or the mid-compartment 313, providing tandem-axle configurations that could be used in the case of heavier payloads.

Figure 3D:
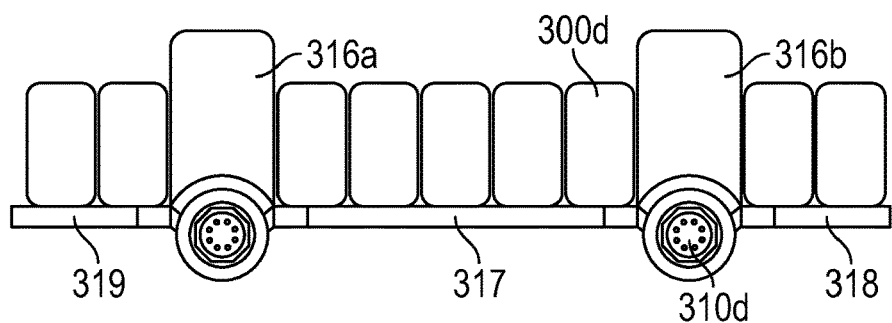

FIG. 3D depicts a configuration of an all-wheel-drive container transport truck. In this exemplary embodiment, two autonomous drive modules 316a and 316b are interconnected with a flat-bed style mid-compartment module 317. Additionally, a flat-bed style rear compartment module 318 and front-compartment module 319 are attached on either side of each of the autonomous drive modules 316a and 316b. This provides extended front- and rear overhangs for support for payloads on either side of the autonomous drive modules.

Figure 4:
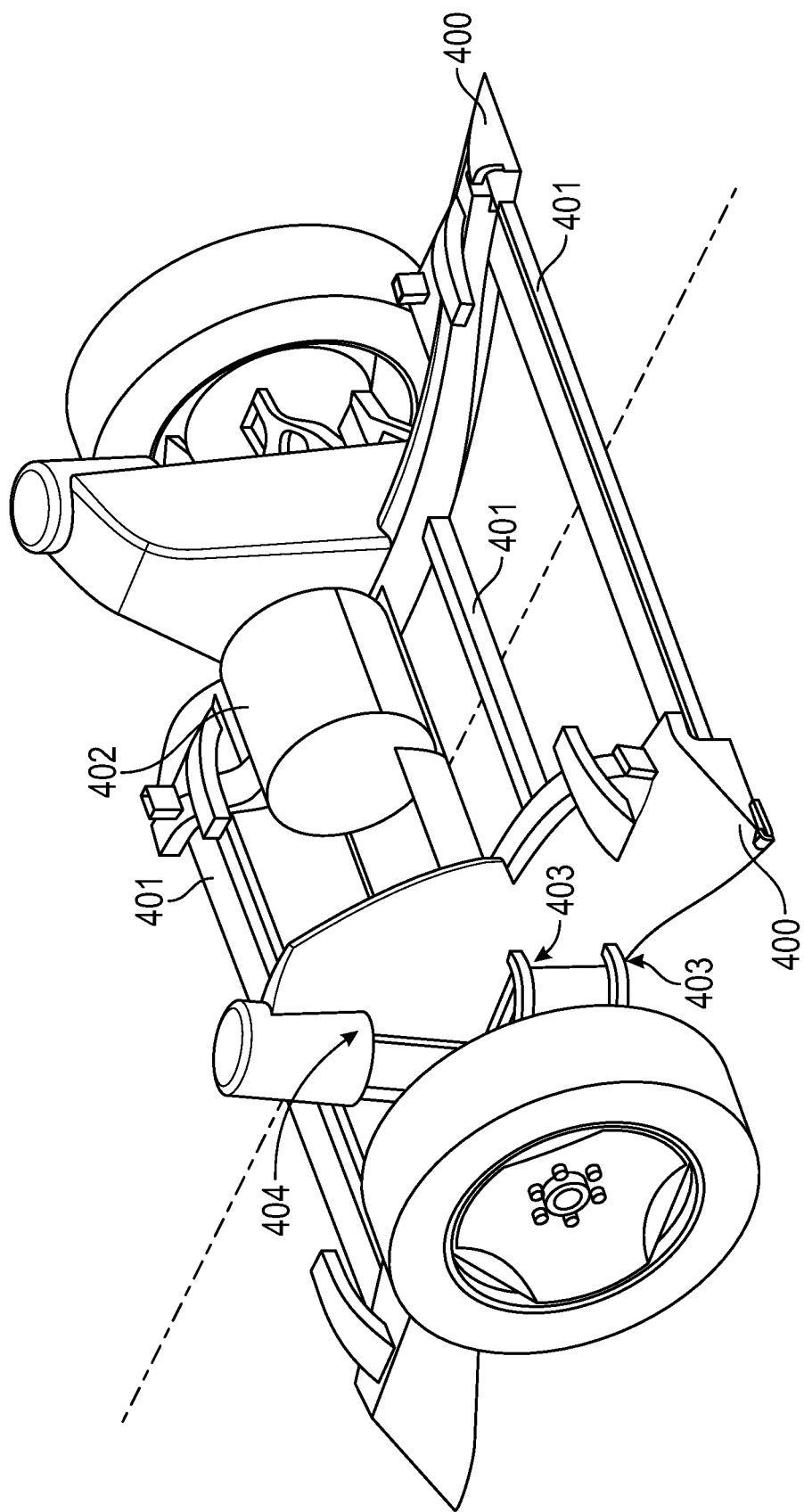
FIG. 4 is an exemplary diagram of the chassis sub-system of the autonomous drive module in accordance with an embodiment.
Figure 5C:
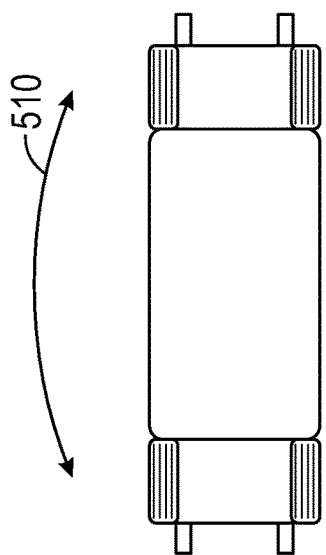
FIGS. 5A, 5B, 5C and 5D are directional indicators of the forward and aft autonomous drive modules operating in concert, in accordance with an embodiment.
Figure 5B:
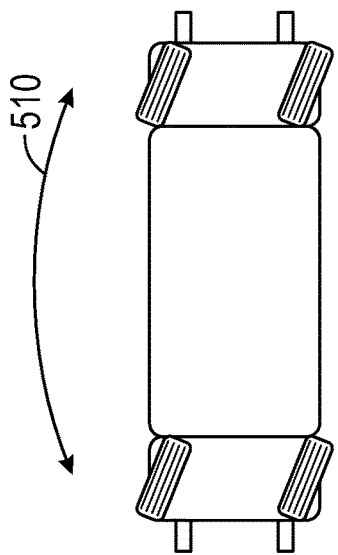
Figure 5A:
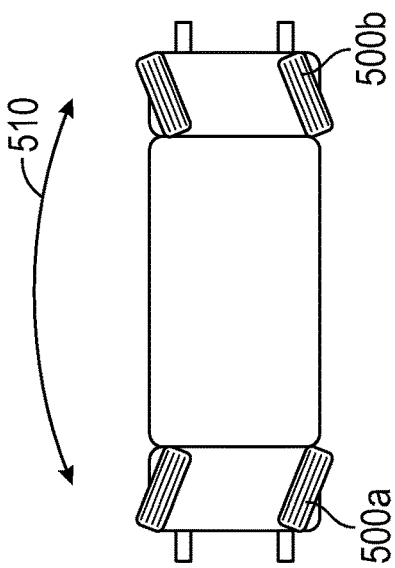
Figure 5D:
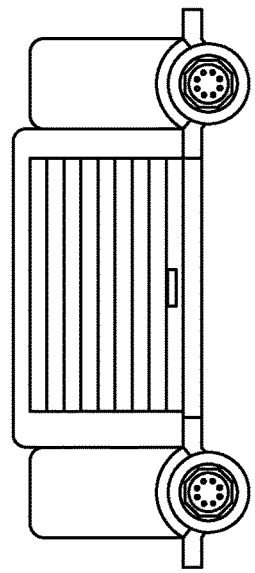

FIG. 4 illustrates an exemplary diagram of the chassis portion of an autonomous drive module, in accordance with an embodiment. In FIG. 4, a structural cradle is composed of longitudinal rails 400 and a series of prismatic cross-members, 401. This structure provides support for the upper body portion, as well as a mounting support for the electric drive motor 402, suspension link attachment points 403, and an attachment point for springs and dampers in the suspension 404. These cross-members are prismatic in form, parallel to each other, and symmetric across the vehicle centerline, such that the overall width of the autonomous drive module can be changed by altering the length of the cross-members. Because these are prismatic in form, parallel, and symmetric, this requires only the cutting of an extrusion, tube, or other prismatic shape to a different length, which does not typically require significant changes to tooling or assembly process, thus enabling a cost-effective method for providing a range of widths in the autonomous drive module.

FIGS. 5A-5D illustrate a set of diagrams of a vehicle utilizing more than one autonomous drive module which requires the actions of each set of autonomous drive modules to be coordinated to produce the desired vehicle motion. This is coordination of each set of modules per vehicle is achieved via a communication link (i.e. data link 510) between the modules (i.e. module 500a and 500b) that compose each vehicle. The data link can communicate information between the modules (i.e. module 500a and 500b) such as autonomous vehicle sensor data, wheels speeds, torques, and steering angles, and wheel loading can be shared across autonomous drive modules. This data link 510 can be "wired" or "wireless", but enables both a) the coordination of torque, brake, and steering functions across modules, b) additional safety through redundancy, as failure in one module can be detected and compensated for in the other module, and c) combinations of steering and torque-application outputs to produce motions such as counter-steer, parallel-steer, and skid-steer that would be difficult or impossible to implement if steering and torque outputs were controlled centrally or mechanically as in a traditional vehicle. Finally, this data link 510 can also be configured with a cross-module link that can include a power connection, such that the batteries in both autonomous drive modules can be charged via a single connection to the charge infrastructure.

Further in reference to FIGS. 5A-5D, for each vehicle, the forward autonomous drive module 500a communicates with aft autonomous drive module 500b to coordinate wheel torques and steer angles to produce desired vehicle motion, including such motions as counter-steer for improved turn radius, parallel-steer for stability, or skid-steer for zero-radius turns on loose surfaces.

Figure 6:
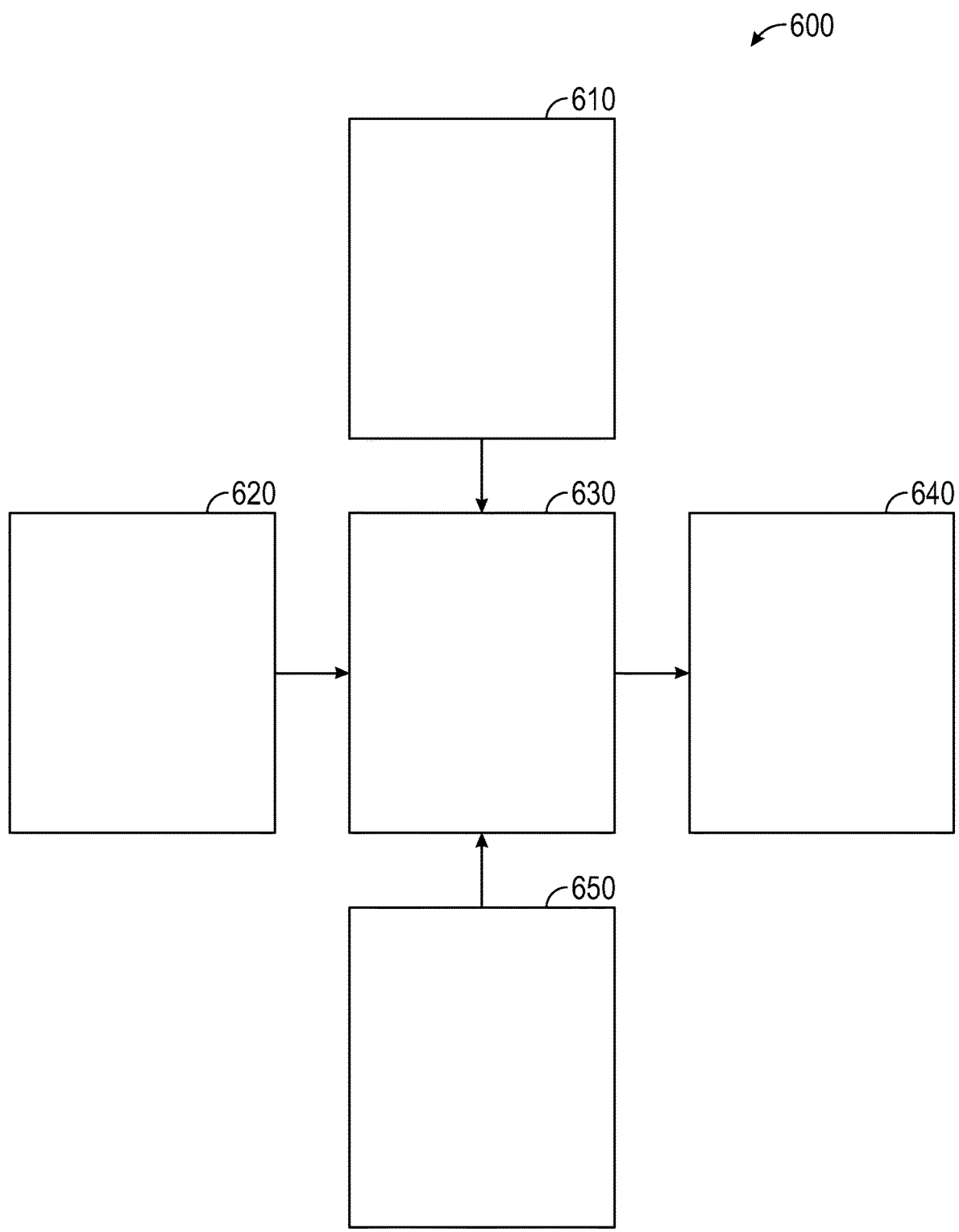
FIG. 6 is an exemplary block diagram of inputs, outputs, control parameters, and systems for operating the autonomous drive module in accordance with an embodiment.

FIG. 6 illustrates a high level control system diagram of the an autonomous vehicle composed of autonomous drive modules, in accordance with an embodiment. The control system 600 includes control parameters 610, inputs 620, autonomous system 630, outputs 640 and noise 650. The control system 600 of the autonomous drive module(s) is designed to be parametric in nature, such that required geometric values (such as wheelbase, overhangs, vehicle width) and relevant control parameters (such as vehicle mass) can be tailored to a specific application without need for a gross revision of the overall control system coding. In this fashion, an autonomous drive module can be configured to a specific application using a generic control system, or re-configured if the overall vehicle configuration is changed during the life of the autonomous drive module. For example, a user can select control parameters 600 to configure the autonomous system 630 for processing inputs 620 to generate outputs 640 taking into account attributes of noise 650 and surface, map and vehicle variations.

The structure of the control system 600 makes physical parameters that can vary between vehicle configurations (such as wheelbase, overhangs, etc.) control parameters 610 rather than constants, as would be the case in a conventional control system. This allows the control system 600 software to be configured to match a specific physical vehicle configuration, such that the bulk of the control system code can be re-used across the many possible physical configurations that could be built using this vehicle architecture.

Figure 7:
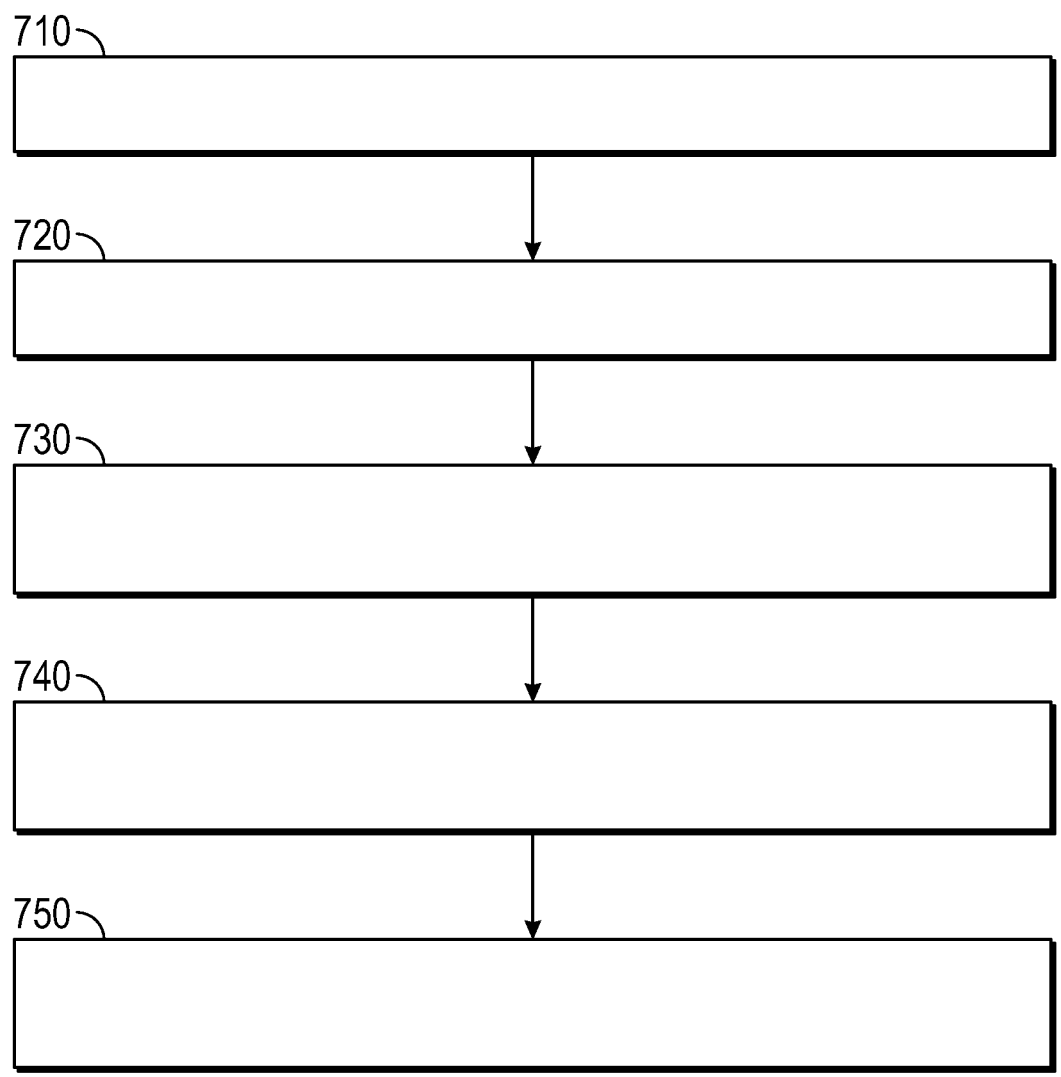
FIG. 7 is an exemplary flowchart of the operation of the autonomous drive modules in accordance with an embodiment.

FIG. 7 depicts a flowchart 700 for implementing a vehicle composed of autonomous drive modules, in accordance with an embodiment. The flowchart 700 includes the following tasks: Task 710 for selecting a configuration of autonomous drive modules and front, mid and rear compartments of a vehicle and internal components such as drive motors, batteries etc.; Task 720 for coupling together the autonomous drive modules with structural rails to form a load bearing structure of the vehicle; Task 730 to configure the sensors for each of the autonomous drive modules in the vehicle; Task 740 to configure the control parameters using parametric control architecture to enable the desired operation of the autonomous drive module; and Task 750, to configure the communication links between pairs of autonomous drive modules to operate in a coordinated manner as desired.

It will be appreciated that the systems and methods may vary from those depicted in the Figures and described herein. For example, the modular architecture of FIG. 1, including the various components and structural cradle, thereof, may vary from that depicted in FIG. 1 and/or described herein, in various embodiments. It will similarly be appreciated that the modular units configured may vary from the depictions in FIG. 2-6 and the accompanying descriptions. It will also be appreciated that the process (and/or subprocesses) disclosed herein may differ from those described herein and/or depicted in FIG. 6, and/or that steps thereof may be performed simultaneously and/or in a different order as described herein and/or depicted in FIG. 6, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. An apparatus configured with an architecture of an autonomous modular drive unit for forming an autonomous vehicle, the apparatus comprising:
   the autonomous modular drive unit which comprises:
   an upper body unit configured to consume space in an upward direction to minimize a horizontal footprint of the upper body unit and enable a stacking of a set of vehicle components on top of each other in the upward direction comprising a battery pack residing at a bottom of the upper body unit, on top of which are components of a charger and high-voltage (HV) electronics, and space allotted on either side of the upper body unit for sensor packages;
   a lower chassis unit configured to oppose the upper body unit and comprise a structure for supporting the modular drive unit with prismatic cross members to configure to a range of module unit widths, the lower chassis unit comprises:
   a drive unit within the lower chassis unit coupled to an axle with a set of wheels on either side; and
   a set of structural rails on either side of the lower chassis unit configured in a rigid frame unit with longitudinal members wherein the structural rails can be attached to another corresponding set of structural rails;
   a plurality of compartment units which comprise: front-compartment, rear-compartment, and mid-compartment units configured to be attached on either side of the lower chassis unit for the forming of the autonomous vehicle;
   at least one sensor placed at an upper peripheral edge of the upper body unit to enable a greater field-of-view resulting from the upward direction of the upper body unit; and
   a set of ducts positioned on either side of the upper body unit and ducted upward through a horizontally oriented heat exchanger at a top surface to the upper body unit un-pinged airflow in air flow-path resulting from a lower air pressure at the top surface of the heat exchanger while the autonomous vehicle is in motion.

2. The apparatus of claim 1, further comprising:
   a control system located in the upper body unit which is designed in a parametric configuration of geometric values comprising items of a wheelbase, overhangs, vehicle width, and control parameters that enable a tailored configuration to a specific application for the autonomous modular drive unit without need for a gross revision of the control system.

3. The apparatus of claim 1, wherein the autonomous modular drive unit is configured to the specific application using a generic control system, or re-configured if the configuration is changed during a life of the drive unit.

4. The apparatus of claim 3, further comprising:
   one or more control parameters selected by an user to configure an autonomous system of the autonomous modular drive unit for processing one or more inputs to generate one or more outputs taking into account attributes of a vehicle operating surface, guidance mapping and vehicle variations in configurations.

5. The apparatus of claim 1, wherein each of the prismatic cross members are arranged in parallel to each other and symmetric about a centerline of the autonomous modular drive unit such that a cutting of an extrusion or a prismatic shape to a different length of each prismatic cross member enables a change of width of the autonomous modular drive unit.

6. The apparatus of claim 5, further comprising:
   a set of autonomous modular drive units configured with a data link between control units of each autonomous modular drive unit to communicate information between each autonomous modular drive unit at least comprising sensor data, wheel speeds, torques and steering angles to enable coordination between each module unit of torque, braking and steering functions.

7. The apparatus of claim 6, wherein communications between control units provide redundancy to enhance safety as a failure of a particular control unit of an autonomous modular drive unit can be detected by another autonomous modular drive control unit.

8. The apparatus of claim 7, wherein the data link configured between each set of autonomous modular drive units enables combinations of steering and torque application outputs that result in producing motions such as counter-steering, parallel steering, and skid steering of sets of autonomous modular drive units.

9. The apparatus of claim 1 further comprising:
   a non-driven wheel module integrated with the upper body unit and is configured with a similar chassis unit of the autonomous modular drive unit without the inclusion of the drive unit.

10. The apparatus of claim 9 wherein the non-driven wheel module is a standalone modular component detachable from the upper body unit.

11. The apparatus of claim 10, the vehicle further comprising:
    an open bed-style mid-compartment affixed to the non-driven wheel module coupled to an autonomous modular drive unit.

12. The apparatus of claim 10, the vehicle further comprising:

a set of multiple non-driven wheel modules or a set of multiple autonomous connected in series and affixed to one or more rear compartment modules.

13. A method using an architecture of modular units of an autonomous modular drive unit for forming an autonomous vehicle, the method comprising:
configuring an upper body unit to consume space in an upward direction to thereby minimizing a horizontal footprint of the upper body unit by enabling a stacking of a set of vehicle components on top of each other in the upward direction comprising: a battery pack residing at a bottom of the upper body unit, on top of which are components of a charger and high-voltage (HV) electronics, and allotting space on either side of the upper body unit for sensor packages;
configuring a lower chassis unit for opposing the upper body unit and comprising a structure for supporting the modular drive unit with prismatic cross members for configuring a range of module unit widths by:
coupling a drive unit within the lower chassis unit to an axle with a set of wheels on either side; and
configuring a set of structural rails on either side of the lower chassis unit in a rigid frame unit with longitudinal members wherein the structural rails can be attached to another corresponding set of structural rails;
attaching a plurality of compartment units comprising: front-compartment, rear-compartment, and mid-compartment units configured on either side of the lower chassis unit for the forming of the autonomous vehicle;
placing at least one sensor placed at an upper peripheral edge of the upper body unit to enable a greater field-of-view resulting from the upward direction of the upper body unit; and
positioning a set of ducts on either side of the upper body unit and ducted upward through a horizontally oriented heat exchanger at a top surface to the upper body unit thereby un-pinging airflow in air flow-path resulting from a lower air pressure at the top surface of the heat exchanger while the autonomous vehicle is in motion.

14. The method of claim 13, further comprising:
configuring a control system located in the upper body unit with a parametric design of geometric values comprising items of a wheelbase, overhangs, vehicle width, and control parameters that enable a tailoring to a specific application for the autonomous modular drive unit without needing a gross revision of the control system.

15. The method of claim 14, further comprising:
configuring a set of autonomous modular drive units with a data link between control units of each autonomous modular drive unit for communicating information between each autonomous modular drive unit at least comprising sensor data, wheel speeds, torques and steering angles to enable coordination between each module unit of torque, braking and steering functions;
providing redundancy in communications between control units to enhance safety as a failure of a particular control unit of an autonomous modular drive unit can be detected by another autonomous modular drive control unit; and
configuring the data link between each set of autonomous modular drive units thereby enabling combinations of steering and torque application outputs that result in producing motions such as counter-steering, parallel steering, and skid steering of sets of autonomous modular drive units.

16. The method of claim 15, further comprising:
integrating a non-driven wheel module with the upper body unit or as a standalone modular component detachable from the upper body unit which is configured with a similar chassis unit of the autonomous modular drive unit without the including the drive unit; and
affixing an open bed-style mid-compartment to the non-driven wheel module coupled to the autonomous modular drive unit.

17. The method of claim 14, further comprising:
configuring the autonomous modular drive unit to the specific application using a generic control system, or re-configuring if the configuration is changed during a life of the drive unit; and
selecting, by a user, one or more control parameters to configure an autonomous system of the autonomous modular drive unit for processing one or more inputs to generate one or more outputs taking into account attributes of a vehicle operating surface, guidance mapping and vehicle variations in configurations.

18. The method of claim 13, further comprising:
arranging each of the prismatic cross-members in parallel to each other and symmetric about a centerline of the autonomous vehicle thereby enabling only a step of a cutting of an extrusion or a prismatic shape to change to a different length of each prismatic cross member resulting in a change of width of the autonomous modular drive unit.

19. A system configured with an architecture of an autonomous modular drive unit for forming an autonomous vehicle, the system comprising:
the autonomous modular drive unit which comprises:
an upper body unit configured to consume space in an upward direction to minimize a horizontal footprint of the upper body unit and enable a stacking of a set of vehicle components on top of each other in the upward direction comprising a battery pack residing at a bottom of the upper body unit, on top of which are components of a charger and high-voltage (HV) electronics, and space allotted on either side of the upper body unit for sensor packages;
a lower chassis unit configured to oppose the upper body unit and comprise a structure for supporting the modular drive unit with prismatic cross members to configure to a range of module unit widths, the lower chassis unit comprises:
a drive unit within the lower chassis unit coupled to an axle with a set of wheels on either side; and
a set of structural rails on either side of the lower chassis unit configured in a rigid frame unit with longitudinal members wherein the structural rails can be attached to another corresponding set of structural rails;
a plurality of compartment units which comprise: front-compartment, rear-compartment, and mid-compartment units configured to be attached on either side of the lower chassis unit for the forming of the autonomous vehicle;
at least one sensor placed at an upper peripheral edge of the upper body unit to enable a greater field-of-view resulting from the upward direction of the upper body unit;

a set of ducts positioned on either side of the upper body unit and ducted upward through a horizontally oriented heat exchanger at a top surface to the upper body unit un-pinged airflow in air flow-path resulting from a lower air pressure at the top surface of the heat exchanger while the autonomous vehicle is in motion;

a control system located in the upper body unit which is designed in a parametric configuration of geometric values comprising items of a wheelbase, overhangs, vehicle width, and control parameters that enable a tailored configuration to a specific application for the autonomous modular drive unit without need for a gross revision of the control system wherein the autonomous modular drive unit is configured to the specific application using a generic control system, or re-configured if the configuration is changed during a life of the drive unit; and a data link between control units of sets of autonomous modular drive units to communicate information between each autonomous modular drive unit at least comprising sensor data, wheel speeds, torques and steering angles to enable coordination between each module unit of torque, braking and steering functions wherein communications between control units provide redundancy to enhance safety as a failure of a particular control unit of an autonomous modular drive unit can be detected by another autonomous modular drive control unit wherein the data link configured between each set of autonomous modular drive units enables combinations of steering and torque application outputs that result in producing motions such as counter-steering, parallel steering, and skid steering of sets of autonomous modular drive units.

20. The system of claim 19, wherein each of the prismatic cross members are arranged in parallel to each other and symmetric about a centerline of the autonomous modular drive unit such that a cutting of an extrusion or a prismatic shape to a different length of each prismatic cross member results in a change of width of the modular drive unit.

* * * * *